May 25, 1937.  C. C. FARMER  2,081,663
RETARDATION CONTROLLER
Filed Jan. 9, 1935   3 Sheets-Sheet 2

INVENTOR
CLYDE C. FARMER
BY Wm. M. Cady
ATTORNEY

Patented May 25, 1937

2,081,663

UNITED STATES PATENT OFFICE 2,081,663

RETARDATION CONTROLLER

Clyde C. Farmer, Pittsburgh, Pa., assignor to The Westinghouse Air Brake Company, Wilmerding, Pa., a corporation of Pennsylvania Application January 9, 1935, Serial No. 971

26 Claims. (Cl. 303—24)

This invention relates to vehicle brakes and more particularly to means for controlling the degree of application of the brakes to automatically regulate the rate of retardation of the vehicle.

It is well known that for a given braking pressure friction type brakes are less effective in retarding the vehicle at high speeds than at low speeds because the coefficient of friction between the rubbing parts is lower at high speeds than at low speeds. In order to bring a vehicle to a stop quickly it has been the usual practice for an operator to apply the brakes with a high degree of braking pressure at high speeds, and, as the speed of the vehicle decreases, to so operate the brakes as to cause the braking pressure to decrease in such a manner that the vehicle is brought to a stop quickly and smoothly without dangerous shock or sliding of the wheels. Various devices have been developed to automatically accomplish such varying of the braking pressure in response to the movement of an element so that the braking pressure is varied to effect a predetermined rate of retardation of the vehicle. The retardation control devices heretofore used, however, have usually been constructed in such a manner that they were operable only for a single rate of retardation. This was not satisfactory for all phases of operation and it is desirable to have means to adjustably vary the rates of retardation to which the retardation controller is responsive.

It is the principal object of my invention, therefore, to provide retardation control apparatus adapted for use on a vehicle such as a railway train which apparatus may be adjustably controlled to effect different degrees of application of the brakes whereby different rates of retardation of the vehicle are automatically secured.

Another object of my invention is to provide a retardation control device in which the rate of retardation to which the device is responsive is adjustably variable, and which has a maximum rate of retardation to which it is automatically adjusted on emergency application of the brakes irrespective of the rate of retardation to which it has been previously adjusted.

A further object of the invention is to provide a vehicle brake equipment adapted to permit either a service application or an emergency application of the brakes and having associated therewith automatically operable retardation control means which is operable to automatically control the degree of application of the brakes to effect a predetermined rate of retardation of the vehicle.

Another object of the invention is to provide a vehicle braking equipment adapted to permit either a service application or an emergency application of the brakes and having retardation control means associated therewith and operable to control the degree of application of the brakes to effect a uniform rate of retardation of the vehicle and having manually operable means to adjustably vary the rate of retardation during a service application of the brakes.

A further object of the invention is to provide a vehicle braking equipment adapted to permit a service application or an emergency application of the brakes and having retardation control means associated therewith to automatically control the degree of application of the brakes to effect a substantially uniform rate of retardation of the vehicle, and having safety means associated therewith for effecting an emergency application of the brakes, which means is also effective to adjust the retardation control means to its maximum value irrespective of the value to which it has been previously adjusted.

Another object of my invention is to provide an inertia responsive control device incorporating manually operable adjusting means by means of which the force of inertia required to effect movement of the inertia responsive member employed in the control device to the operative position in its range of movement may be adjustably varied.

Other objects of the invention and features of novelty will be apparent from the following description taken in connection with the accompanying drawings in which.

Figures 1, 4, 5, 12:
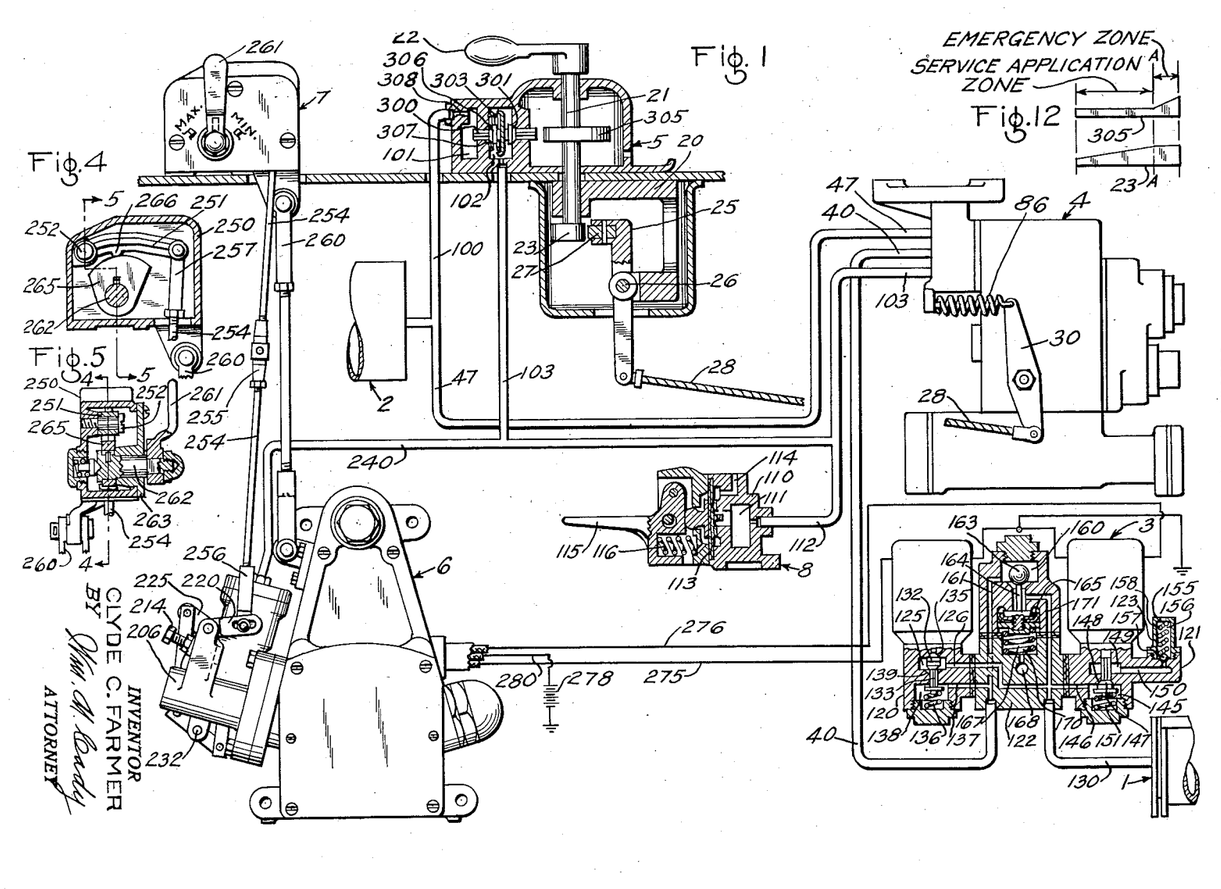
Figure 1 is a diagrammatic view of one embodiment of the vehicle brake equipment provided by my invention and arranged for installation on a single vehicle.
Figure 4 is a sectional view of the manual control member employed in the system shown in Figure 1, the view being taken substantially along the line 4—4 of Figure 5.
Figure 5 is a sectional view of the control member shown in Figure 4, this view being taken substantially along the line 5—5 of Figure 4.
Figure 12 is a diagrammatic development of the manual control means employed in the system shown in Figure 1.

Referring to the drawings and more particularly to Figure 1 thereof the embodiment of the invention therein illustrated comprises a brake cylinder 1 which is supplied with fluid under pressure from a main reservoir 2, the supply of fluid being regulated by an electroresponsive brake controlling valve device 3, a brake valve device 4, a manual brake control device 5, and an inertia responsive control device 6 which is adjustably variable by means of a manual control element 7, while the fluid flowing to the brake cylinder 1 is also controlled by the foot valve device 8.

Considering now in detail the construction of each of the elements employed in the brake system illustrated in Figure 1, the manual brake control device which is indicated generally by the reference character 5, comprises a frame 20 which has journaled therein a shaft 21 having secured on its upper end an operating handle 22, and having secured adjacent the lower end thereof, a suitable cam element 23. The frame 20 also has a lever 25 pivotally mounted thereon by means of a pin 26, the lever 25 having an end portion 27 adapted to be engaged by the cam 23 upon rotation of the shaft by the handle 22, while the other end of the lever 25 has pivotally connected thereto a cable or other suitable operating member 28 the other end of which is connected to an end of the lever 30 of the brake valve device 4. The cam 23 is of irregular shape and has a cam surface which increases in radius throughout a portion of its circumference, so that when the cam is rotated, the upper end of the lever is forced to the right as viewed in Figure 1, this portion of the cam corresponding to the service application position of the manual brake control means. This cam also has a portion of relatively small radius adjacent one side of the first mentioned portion, this portion corresponding to the release portion of the brake control means, while there is a portion of relatively great radius adjacent the other side of the first mentioned cam surface which corresponds to the emergency application position of the brake control means.

Figures 3, 6, 11:
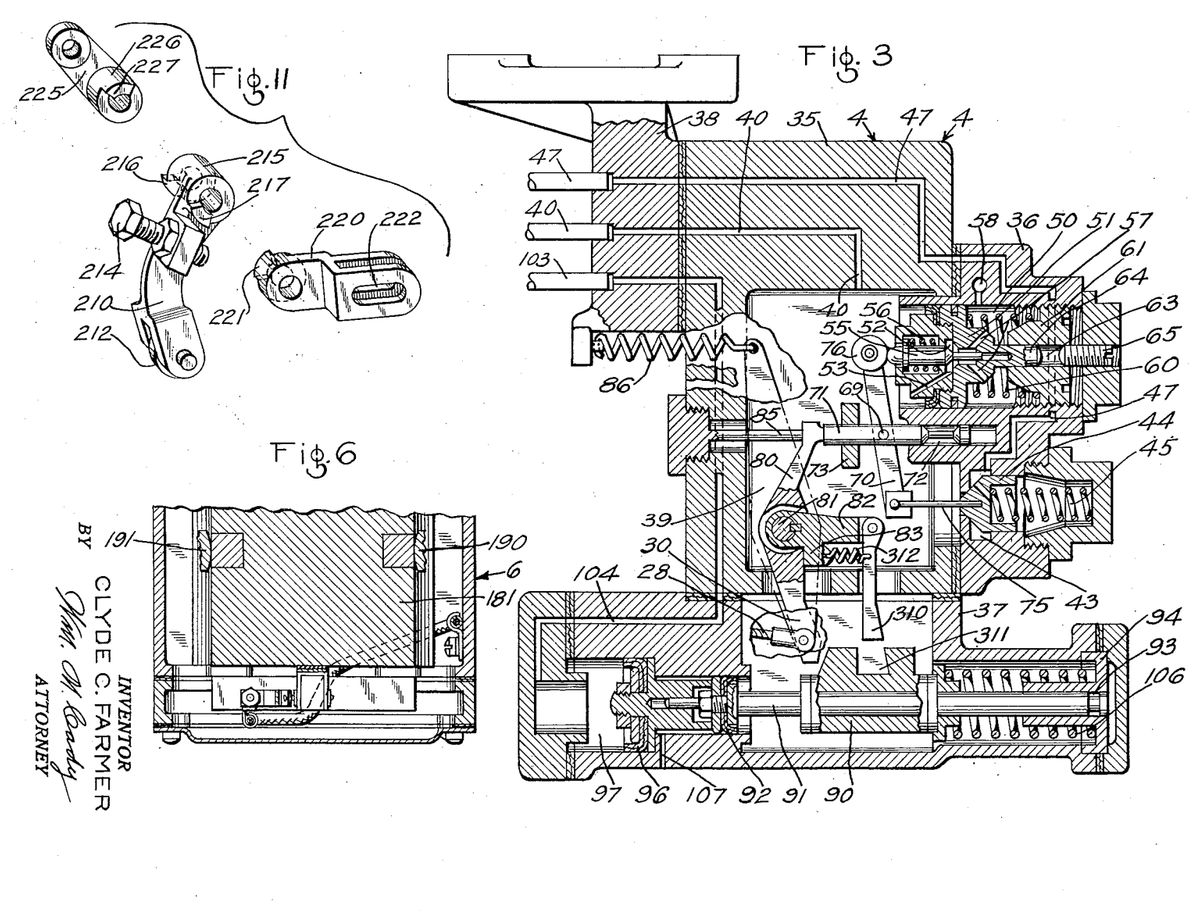
Figure 3 is a sectional view of a brake valve device which may comprise a part of the system shown in Figure 1.
Figure 6 is a fragmentary sectional view taken substantially along the line 6—6 of Figure 2.
Figure 11 is a perspective view of portions of the control mechanism employed in connection with the inertia responsive control device shown in Figure 2.

The brake valve device 4 is preferably of the self-lapping type and its construction is best shown in Figure 3 of the drawings. As shown in the drawings the brake valve device 4 comprises a main casing section 35, a valve section 36, an emergency portion 37, and a pipe bracket section 38, which when assembled together define a pressure chamber 39 which is in constant communication with the brake cylinder by way of the pipe and passage 40.

The valve section 36 is provided with a valve chamber 43 in which is disposed a supply valve element 44, which is urged toward the seated position by a coil spring 45. The valve element 44 controls the supply of fluid under pressure from the main reservoir 2 by way of the pipe and passage 47 and the valve chamber 43.

The valve section 36 is also provided with a piston chamber 50 in which is mounted a piston 51 which is provided with a valve chamber 52 which is in communication with the pressure chamber 39 by way of a passage 53.

Positioned within the chamber 52 is a release valve element 55 which is biased to the unseated position by a coil spring 56, and when the valve element 55 is in its unseated position the valve chamber 52 is in communication with the atmosphere by way of the passage 57, piston chamber 50 and the passage 58, and when the release valve is in its seated position this communication is cut off.

The piston 51 is subject on one side to the pressure of the fluid in the pressure chamber 39, and, on the other side, to the pressure of the coil spring 60. The tension of the spring 60 may be regulated by a suitable regulating member 61. This member is provided with a central bore 63 adapted to receive a reduced extension 64 of the piston 51, while a regulating screw 65 is adapted to extend into the bore 63 to limit the amount of movement of the piston 51 to the right as viewed in Figure 3.

For actuating the supply valve element 44 to its application position, and the release valve 55 to the seated position, there is provided a mechanism including a lever 70 which is secured intermediate its ends on the pin 69 to a floating pivot carrier 71 which is slidably mounted in a bore 72 in the valve section 36 and in a guiding lug 73 formed integral with the main casing section 35.

A stem 75 is pivotally secured to the lower end of the lever 70 and extends into a bore in the end of the supply valve element 44. A roller 76 is pivotally mounted on the other end of the lever 70 and is adapted to engage the rounded end of the release valve element 55.

The springs 45, 56 and 60 are of different values, the spring 45 being of greater resistance than the spring 56, but being of less resistance than the spring 60. When the floating pivot carrier 71 is moved to the right, as viewed in Figures 3 and 4, the lever 70 will pivot on the axis formed by the stem 75, and the release valve element 55 will be moved to the right against the pressure of the spring 56 so as to close the passages controlled thereby. On engagement of the release valve element 55 with its seat, and, on further movement of the floating pivot carrier 71 to the right, the lever 70 will pivot on the axis formed by the roller 76, and the supply valve element 44 will be moved to the right to open the passage leading from the main reservoir to the pressure chamber 39. The spring 60 is of such a value, and the lever 70 and associated members are so proportioned that movement of the floating carrier 71 does not affect the position of the piston 51.

For actuating the floating pivot carrier 71 there is provided a lever 80 which is loosely mounted on a shaft 81, which is journaled in the main casing section 35 and which projects through the casing section wall and has the lever 30 secured to the outer end thereof. A lever 82 is rigidly secured on the shaft 81 and is provided with a lug or projecting portion 83 which overlies a portion of the lever 80 so that when the lever 82 is moved in a clockwise direction, as viewed in Figure 3, the lug 83 will engage the lever 80 and cause it to move the floating pivot carrier 71. A suitable stop 85 engages a portion of the lever 80 to limit the movement of this lever in the counter-clockwise direction. The lever 30, which is mounted outside of the main casing section 35, has the operating member 28 secured to one end thereof, and has secured to the other end thereof a spring 86 which urges the lever 30 in a counter-clockwise direction.

As will be seen in Figure 1, when the handle 22 is operated so as to cause the cam 23 to engage the end 27 of the lever 25, the cable 28 will be urged to the left causing the lever 30 to be moved in a clockwise direction which will effect movement of the floating pivot carrier 71 so as to cause the release valve element 55 to move to the closed position, and thereafter to cause the supply valve element 44 to be moved to the open position, thus allowing fluid under pressure to flow from the main reservoir 2 through the pipe and passage 47 to the pressure chamber 39. When the pressure in the chamber 39 builds up to a sufficient value the piston 51 is moved to the right against the pressure of the spring 60. When the piston 51 has moved to the right a sufficient distance the lever 70 will pivot on the pin 69, being urged in a clockwise direction by the spring 45 pressing on the supply valve member 44, while the roller 76 is held only by the spring 56, which, as pointed out above, is of a smaller value than the spring 45. The supply valve member, therefore, will be moved to its seated position, thereby cutting off the flow of fluid under pressure to the pressure chamber 39 and the supply of fluid will thus be lapped. It will be seen that the farther the floating pivot carrier 71 is moved to the right the greater will be the pressure required to actuate the piston 51 to the right against the pressure of the spring 60 to effect a seating of the supply valve element 44. As the movement of the floating pivot carrier 71 is governed by movement of the control handle 22 of the control device 5 it is clear that the pressure at which the valve mechanism laps the supply of fluid to the pressure chamber 39 corresponds to the degree of movement of the handle 22.

When the handle 22 is moved to the release position the floating pivot carrier 71 will be permitted to move to the left as viewed in Figure 3, so that the supply valve element 44 will be seated, and the release valve element 55 will be unseated by the action of the spring 56, whereupon fluid under pressure will be released from the pressure chamber 39, and hence from the brake cylinder 1, to the atmosphere.

The emergency portion 37 of the brake valve device 4 is provided with a latch block 90 which is secured to a rod 91, which has mounted on one end thereof a piston 92 and which has the other end thereof slidably positioned in a bore 93 in a guiding element 94. For operating the rod 91 and the latch block 90 to the right there is provided a piston 96 disposed in a chamber 97 and adapted to engage the piston 92 which is secured on the rod 91. Fluid under pressure is supplied to the chamber 97 from the main reservoir 2 by means of the pipe 100, chambers 101 and 102, safety control pipe 103 and the passage 104. As long as fluid under pressure is supplied to the chamber 97 at a pressure substantially equal to that in the main reservoir 2 the piston 96 will maintain the latch block 90 and rod 91 in the position to the right as shown in Figure 3, but when fluid is released from the chamber 97 the piston 96 is permitted to move to the left and a spring 106 then moves the latch block 90 to the left so that the upper portion of the latch block 90 engages the lower end of the lever 80 to move it in a clockwise direction. The rod 91 is also urged to the left by pressure of the fluid in the pressure chamber 39 acting on the piston 92, which also serves to prevent the escape of the fluid under pressure from the chamber 39. An atmospheric vent passage 107 opens to the chamber intermediate the pistons 92 and 96 so that the chamber is maintained at atmospheric pressure.

The foot valve device 8 is also in communication with the chamber 97 by way of the safety control pipe 103 and the passage 104. In addition a piston chamber associated with the inertia responsive control device is in communication with the chamber 97 by way of the passage 104, and the safety control pipe 103. The purpose of this will appear later.

The foot valve device 8 comprises a casing 110 in which is formed a chamber 111 which is in communication with the safety control pipe 103 by way of a pipe 112. A valve element 113 is provided which controls the flow of fluid under pressure from the chamber 111 to the atmosphere through the passage 114. The valve element 113 is held seated by maintaining pressure on the foot pedal 115 which actuates the valve element to the seated position. When pressure on the foot pedal 115 is released the spring 116 urges the foot pedal out of engagement with the valve element and the pressure of the fluid in the chamber 111 may then unseat the valve 113 and permit the fluid to flow past the unseated valve to the passage 114 and thence to the atmosphere.

The brake controlling valve device 2 comprises a supply magnet valve section 120, a release magnet valve section 121, an inshot valve section 122, and a safety valve device 123 which is secured to the release magnet valve section 121.

The supply magnet valve section 120 comprises a casing provided with a valve chamber 125 having constant communication with the brake cylinder 1 by a passage 126 and pipe 130 and having disposed therein a double beat valve 132 secured to a valve stem 133. The double beat valve 132 is urged towards an upper seat 135 by a spring 136 operating on the lower end of the valve stem 133 so that when the valve is in position against the upper seat fluid under pressure may flow from the pipe 40 leading from the brake valve device 4 to the passage 137, to the chamber 138, and thence through the open valve seat 139 to the passage 126, and to the brake cylinder. The double beat valve is urged to its lower seat 139 by an electro-magnet, (not shown), in the upper portion of the casing, which, when energized, forces the valve downwardly to its lower seated position thereby cutting off the supply of fluid under pressure to the brake cylinder 1.

The release magnet valve section 121 comprises a casing defining a valve chamber 145, having constant communication with the brake cylinder by way of the pipe 130 and a passage 146, and having disposed therein a valve element 147 which cooperates with a seat 148 to control the release of fluid under pressure from the brake cylinder 1 to the atmosphere by way of chamber 149, passage 150 and the safety valve device 123. The valve element 147 is urged toward its seated position by a spring 151 and to the unseated position by an electromagnet, (not shown), in the upper part of the casing, which, when energized, moves the valve element 147 downwardly away from the seat 148.

The safety valve device 123 comprises a casing section 155 defining a valve chamber 156 in which is positioned a suitable valve element, such as a ball 157, which cooperates with a seat formed in the casing section 121 to control the release of fluid under pressure from the chamber 149. The ball 157 is urged to its seat by a spring 158 and the safety valve device acts in a well known manner to prevent the entire release of fluid under pressure from the brake cylinder.

The inshot valve section 122 comprises a casing defining a valve chamber 160 having communication with the reservoir 2 by way of a passage 161 which communicates with the pipe 40 and the brake valve device 4. Positioned in the valve chamber 160 is a ball valve element 163 which is engaged by a stem 164 associated with a piston 165 mounted in a chamber 167 having constant communication with the atmosphere by way of a passage 168. The ball valve 163 is urged to the unseated position by a spring 170 acting upon the piston 165, and when the ball valve 163 is in the unseated position, fluid under pressure may flow from the chamber 160 to the brake cylinder 1 by way of passage 171 and the pipe 130.

The resistance of the spring 170 is such that when a predetermined or selected pressure has been built up in the brake cylinder 1 the pressure will manifest itself on the upper side of the piston 165 to urge the piston downwardly against the compression spring 170 until the ball valve 163 is seated, whereupon the flow of fluid under pressure from the chamber 160 to the brake cylinder is cut off. It will be seen, therefore, that the construction of the brake controlling valve device is such that for fluid pressures below a predetermined value fluid may flow from the brake valve device 4 to the pipe 40, and thence through the inshot valve section to the brake cylinder, but that when the pressure in the brake cylinder is built up to a predetermined value further flow of fluid through the inshot valve device is cut off and the supply of fluid to the brake cylinder is thereafter controlled by the supply magnet valve section 120.

Figures 2, 7, 8, 9, 10:
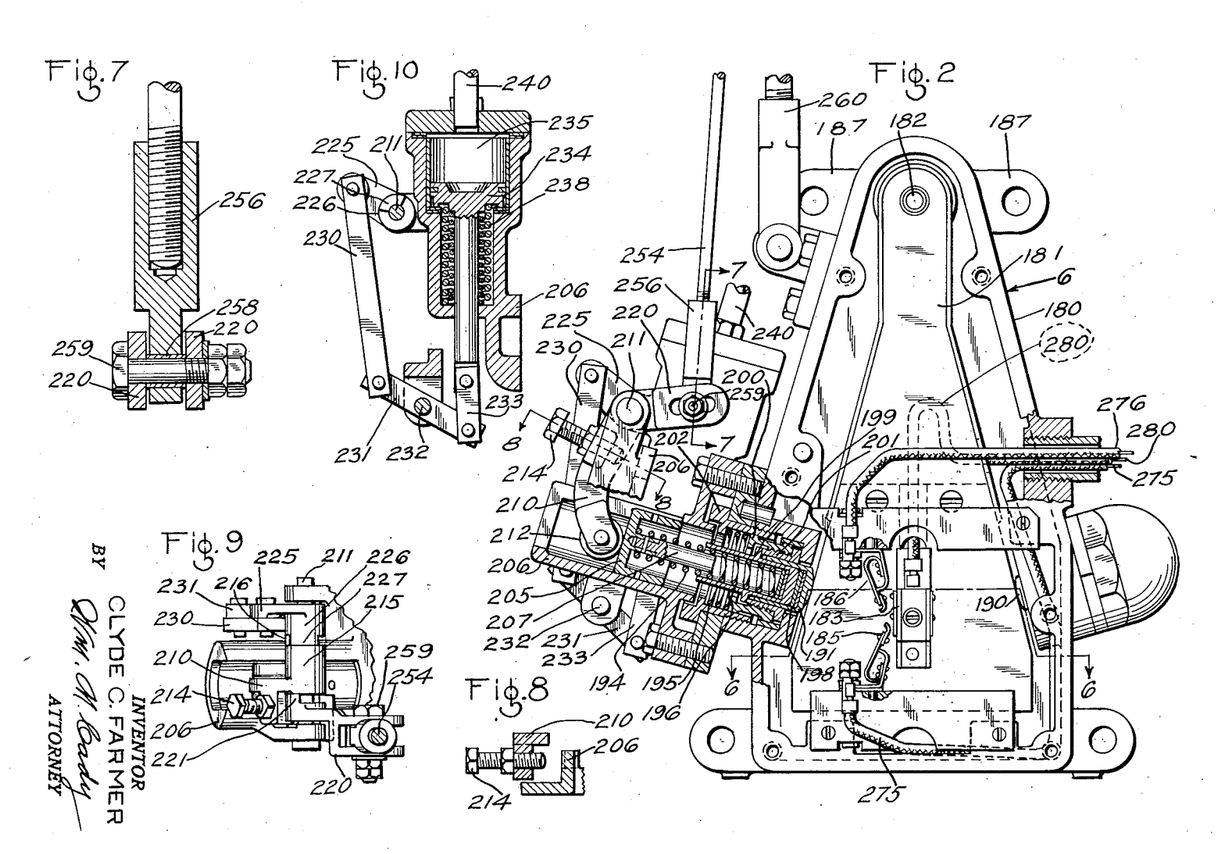
Figure 2 is a view of the inertia responsive control device employed in the system shown in Fig. 1.
Figure 7 is a fragmentary sectional view taken substantially along the line 7—7 of Figure 2.
Figure 8 is a fragmentary sectional view taken substantially along the line 8—8 of Figure 2.
Figure 9 is a fragmentary top plan view of a portion of the inertia responsive control device shown in Figure 2.
Figure 10 is a fragmentary sectional view of a portion of the control means employed in connection with the inertia responsive control device shown in Figure 2.

The inertia responsive control device 6 is provided with a housing indicated generally by the reference character 180, which encloses a weighted body 181 which is suspended from a pivot 182 and carries a contact 183 adapted to engage the contacts 185 and 186, which are supported by the housing 180 and insulated therefrom. The control device 6 is adapted to be secured to the vehicle by lugs 187 in such a manner that when the vehicle is on a true horizontal track or roadway the weighted body 181 is in a balanced or normal position with the contacts 185 and 186 out of engagement with the contact 183. The weighted body 181 swings as a pendulum about the pivot 182 and is normally held in the normal position by the opposing, spring-pressed plungers 190 and 191 and is adapted to be moved in opposition to one of these plungers when acted upon by force of inertia as during a change in the rate of speed of the vehicle.

The plunger 190 may be of any suitable construction and preferably has a spring associated therewith and normally urging the plunger into engagement with the weighted body 181 and opposing the movement of this body to the right as viewed in Figure 2.

The plunger 191 is preferably constructed so that initial or short movements of the plunger away from the normal position are opposed by a spring 194, while larger movements are opposed by a spring 195 in addition to the spring 194. The spring 194 is positioned in a sleeve member 196 interfitting with the plunger 191 and having shims 198 disposed therebetween for the purpose of adjusting contact between the plunger 191 and the weighted body 181. The sleeve member 196 is provided with an annular flange 199 which is engageable with a radially inwardly extending flange on the member 200 and with the end portion of the member 201 which is secured in the member 200, and, as shown in drawings, a limited amount of movement is permitted the sleeve 196 between the members 200 and 201. The member 200 is slidably mounted in the casing section 202 and is urged in a direction toward the weighted body 181 by the spring 195.

The outer end of the spring 194 engages a plunger 205 which is reciprocably movable in a guideway formed in the casing section 206 and has a stem 207 over which the spring is fitted. The pressure which the spring 194 exerts on the plunger 191 may be adjustably varied by moving the plunger 205 towards or away from the weighted body 181.

Adjustment of the plunger 205 is effected by means of the lever 210 which is mounted on a shaft 211 which is supported on bearings formed in the casing section 206 and which has a roller 212 mounted in the end thereof and engageable with the plunger 205.

An adjusting screw 214 is provided for the lever 210 and is engageable with a portion of the casing section 206 to limit the inward movement of the arm or lever 210 and thereby control the degree to which the spring 194 may be compressed.

The lever 210 is mounted on the shaft 211 and its hub portion 215 is provided with projecting portions 216 and 217 which extend throughout a portion only of the circumference of the hub, as is best shown in Figure 11 of the drawings. A lever 220 is also journaled on the shaft 211 and its hub portion is provided with a projecting portion 221 which is adapted to engage the projecting portion 217 on the lever 210 when the lever 220 is oscillated. The projecting portion 221 extends through only a portion of the circumference of the hub portion of the lever 220, and, as will be understood, when the lever 220 is turned in a counter-clockwise direction the projecting portion 221 will engage the projecting portion 217 and cause the lever 210 to be rotated in a counter-clockwise direction. However, as the projecting portions 216 and 221 each extend through only a small portion of the circumference of the hub portions of these members, the lever 210 may be rotated in a counter-clockwise direction without effecting movement of the lever 220. The lever 220 has adjacent the other end thereof a slot 222 adapted to receive an operating member which will be described in detail below.

The shaft 211 also has mounted thereon a lever 225 positioned on the opposite side of the lever 210 from the lever 220 and which has a hub portion 226 provided with a projection 227 extending throughout a portion only of the circumference of the hub portion and adapted to engage the projecting portion 216 on the lever 210.

As will be understood when the lever 225 is rotated in a counter-clockwise direction the projection 227 will engage the projection 216 to cause the lever 210 to be moved in a counter-clockwise direction. As the projections 227 and 216 extend throughout a portion only of the circumference of the hub portions of the members 225 and 210, respectively, the lever 210 may be rotated in a counter-clockwise direction relative to the lever 225 without effecting movement of the lever 225. It is clear, therefore, that the lever 210 may be moved by either the lever 220 or the lever 225 to effect an increase in the degree of compression of the spring 194 without changing the position of the other lever and irrespective of the position to which the lever 210 may have been moved by either of the levers 220 or 225.

The degree of compression of the spring 194, therefore, may be adjustably varied in either of two ways, one way being by means of the lever 220 and the other way being by means of the lever 225.

As is best shown in Figure 10 of the drawings the lever 225 has secured in the opening in the end thereof, a connecting link 230 which has its other end pivotally secured to a lever 231 which is pivotally mounted intermediate its ends on a suitable pin 232, and has pivotally secured to its other end through the medium of the link 233, a piston 234 which is disposed in a cylinder 235 formed in a portion of the casing section 206. A spring 238 is also positioned in the cylinder 235 and normally urges the piston 234 upwardly as viewed in Figure 10. Fluid under pressure is supplied to the cylinder 235 by the pipe 240, which communicates with the safety control pipe 103 and thereby with the emergency portion of the brake control device 4. The pressure of the fluid in the chamber 235 urges the piston 234 to its lower position, but upon a reduction in the fluid pressure, the spring 238 urges the piston 234 upwardly and movement of the piston in this direction is transmitted through the members 231 and 230 to the lever 225 and thereby to the lever 210 to effect an increase in the pressure on the spring 194 to the maximum permitted by the adjusting screw 214.

The lever 220 has associated therewith means to manually vary the pressure on the spring 194, and as shown in the drawings, this means comprises a manual control element indicated generally by the reference character 7. As shown in the drawings, the manual control element 7 comprises a casing 250 having an arm 251 having one end pivotally secured therein on a suitable pin 252, the arm having secured adjacent the other end thereof a connecting link or rod 254 which has its other end pivotally secured in the slot 222 formed in the end of the lever 220. The rod or connecting link 254 may be of any suitable construction, and, as shown in the drawings, is constructed of a plurality of sections which are joined by a turnbuckle 255 by means of which the length of the rod may be adjustably varied. The ends of the rod have suitable clevises 256 and 257 secured thereon by means of which the rod is pivotally secured to the lever 251 at one end, and to the lever 220 at the other end. The construction of the clevis 256 which is employed at the lower end of the rod 254 is shown in detail in Figure 7 of the drawings, and as therein illustrated, the clevis has a reduced portion adjacent the end having a bushing or sleeve 258 mounted in an aperture adjacent the end of the clevis and adapted to be clamped between the arms of the lever 220 by a bolt 259 so as to be held at a selected point in the slot 222 formed in the lever 220.

The manual control element 7 may be secured in any suitable manner to the vehicle, and, in order to maintain accurate spacing between the control element 7 and the inertia responsive control device 6, a spacing member 260 is provided which has one end secured to the manual control member 7 and the other end secured to the housing of the inertia responsive control device 6.

Means is provided to control movement of the rod 254, and as shown in the drawings, this means comprises a manual operating handle 261 which is mounted on a shaft 262 journaled in the casing section 263, and which has secured on the opposite end a cam 265 which is engageable with a projection 266 on the lever 251. As will be understood, when the handle is rotated in a counter-clockwise direction as viewed in Figure 4 of the drawings, the lever 251 will be moved in a counter-clockwise direction and will effect a similar movement of the lever 220 which movement will be transmitted to the lever 210 to effect an increase in the pressure on the spring 194.

As initial movement of the body 181 is opposed by the spring 194 and subsequent movement of the body is opposed by the spring 195 in addition to the spring 194, it will be apparent that a relatively small force of inertia will move the body against the spring 194 and thereafter a somewhat larger force of inertia is required to move the body against the spring 195. Further, since the force of inertia acting to move the body 181 is proportional to the rate of speed change of the vehicle, the springs 194 and 195 may be proportioned, and the stationary contacts 185 and 186 positioned so that assuming the vehicle to be decelerating, a given rate of speed change will cause the movable contact 183 carried by the body 181 to engage the first stationary contact 185, and another rate of speed change will cause the movable contact 183 to engage the other stationary contact 186. It will be seen also as the pressure of the spring 194 may be adjustably varied, and as the force of inertia necessary to move the body 181 will likewise be varied, that in this manner the rate of speed change which is necessary to effect a movement of the body 181 to move the contact 183 into engagement with the first stationary contact 185 may be adjustably controlled. As the amount of additional force required to move the body 181 against the pressure of the spring 195 at all times remains substantially constant, the difference in the rate of retardation of the vehicle which is necessary to effect compression of the spring 195 over that required to effect compression of the spring 194 will be substantially constant irrespective of the adjustment of the spring 194.

For controlling certain operations for the brake controlling valve device 3 the contact 185 is connected to one side of the electromagnet associated with the supply magnet valve section 120 by a conductor 275, while the contact 186 is connected to one side of the electromagnet associated with the release magnet section 121 by a conductor 276. The other side of the two electromagnets is connected to one side of a suitable source of current supply, for example, a battery 278, while the other side of the battery is connected to the movable contact 183 by a conductor 280. It will be seen, therefore, that when the movable contact 183 engages the stationary contact 185 by movement of the weighted body 181 to the left, as viewed in Figure 2, the supply valve element 132 is caused to be seated on the seat 139 to cut off the flow of fluid under pressure to the brake cylinder through the passage 126, and when the movable contact 183 engages the stationary contact 186 the release valve element 147 is caused to be unseated so that fluid under pressure flows from the brake cylinder 1 through the chamber 145 to the chamber 149 and thence to the atmosphere through the safety valve device 123.

The manual brake control means 5 is provided with means to control the pressure of the fluid in the safety control pipe 103 wherein it is possible to effect not only a service application of the brakes by the manual control means, but also an emergency application of the brakes. As shown in the drawings the manual control means 5 has a casing section having a chamber 101 formed therein which communicates with the pipe 100 leading from the main reservoir 2 through a restricted passage 308, and a second chamber 102 which is in constant communication with the safety control pipe 103. A double beat valve device 300 is positioned in the chamber 102 and is normally urged to the right, as viewed in Figure 1, so that the valve element 301 is urged into engagement with a seat formed in the wall of the chamber 102 and cutting off communication between the chamber 102 and the atmosphere. The shaft 21 has a cam 305 secured thereon and engageable with the end of the valve device 300 and operable in certain positions of the cam to move the valve device 300 to the left, as viewed in Figure 1, against the pressure of the spring 303 so that the valve element 306 seats against the seat 307 surrounding the passage leading from the chamber 101 to the chamber 102, thereby cutting off the flow of fluid under pressure from the main reservoir 2 to the safety control pipe 103. At the same time the valve element 301 is moved away from its seat and fluid is permitted to flow from the safety control pipe 103 to the chamber 102 and therefrom to the atmosphere.

The relationship of the cam 23 controlling the service application of the brakes and the cam 305 controlling the emergency application of the brakes is shown diagrammatically in Figure 12 of the drawings. As shown in this figure of the drawings the cam 23 has a face which is sloping throughout a relatively large portion of the range of movement of the cam and gradually increases from a point adjacent the left hand side of the diagram, which may be considered the release zone, to a point adjacent the broken line A—A which separates the service application zone from the emergency application zone. The cam 23 thereafter has a dwell surface throughout the entire emergency application zone in which zone the cam does not move the lever 27. The cam 305 which controls the emergency application of the brakes has a face which is of substantially uniform width throughout the entire service application zone but which slopes very abruptly throughout the emergency application zone during which period it is effective to move the valve device 300. During a service application of the brakes the cam 305 is not operable to move the valve device 300. It is clear, therefore, that at different points in the range of movement of the manual operating handle 22 of the manual brake control means 5, the brakes will be controlled to effect either a service application of the brakes or an emergency application of the brakes depending upon the amount of movement of the manual control member.

In the operation of the system shown in Figure 1, when it is desired to effect a service application of the brakes the handle 22 of the brake control means 5 is moved to an application position whereupon the lever 25 is moved in a clockwise direction, effecting movement of the lever 30 and causing the floating pivot carrier 71 to be moved to the right to move the release valve member 55 to the seated position and to cause the supply valve member 44 to be moved to the open position, permitting fluid under pressure to flow from the main reservoir 2, through the pipe and passage 47 to the pressure chamber 39 and thence by the passage and pipe 40 to the brake controlling valve device 3 and therethrough to the brake cylinder 1. When the pressure of the fluid in the brake cylinder and the chamber 39 is built up to a predetermined value, depending upon the amount of movement of the lever 30, the valve device 4 will operate to close the supply valve member 44 to cut off the flow of fluid under pressure to the pressure chamber and therefore to the brake cylinder.

The flow of fluid to the brake cylinder through the brake controlling valve device 3 may take place through the passage 137 to the chamber 138 and past the normally open supply magnet valve 132 to the chamber 125 and therefrom by way of the passage 126 to the pipe 130. At the same time fluid under pressure can flow from the pipe 40 to the passage 161 and past the normally open ball valve element 163 to the passage 171 leading to the pipe 130. When the fluid pressure in the brake cylinder has built up to a predetermined value, it will act upon the piston 165 to move it downwardly against the spring 170 until the ball valve element 163 is seated, thereby cutting off the further flow of fluid through the inshot valve device 122.

It will be seen, therefore, that in effecting an application of the brakes fluid will be supplied to the brake cylinder 1 through a passage independent of the application magnet valve 120 until the pressure of the fluid in the brake cylinder 1 has been built up to a predetermined value. This insures that a predetermined brake application may be secured even though the application magnet valve may have been rendered inoperative and be held in the closed position.

Assuming that the direction of travel of the vehicle is to the left as viewed in Figs. 1 and 2, as the vehicle begins to decelerate with the application of the brakes, the force of inertia will act upon the body 181 of the inertia responsive control device 6 to cause it to move to the left against the opposition of the spring 194 to effect engagement of the movable contact 183 with the stationary contact 185. The electromagnet of the supply magnet valve section 120 will be energized and the valve element 132, as a result, will be seated thereby cutting off the flow of fluid under pressure to the brake cylinder.

As the speed of the vehicle diminishes the coefficient of friction between the rubbing parts of the brake elements increases and there will be a similar increase in the rate of retardation of the vehicle. On an increase in the rate of retardation of the vehicle the weight 181 will be caused to move farther to the left so as to effect compression of the spring 195 and to move the movable contact member 183 into engagement with the stationary contact 186. This energizes the winding of the release magnet valve section 121 thus causing the valve element 147 to be unseated, thereby permitting fluid under pressure to flow from the brake cylinder 1 through the pipe 130, passage 146 and chamber 145 to the chamber 149 and thence to the atmosphere through the safety device 123, which acts in a well known manner to prevent the entire release of fluid pressure in the brake cylinder.

If the release of fluid from the brake cylinder causes the desired decrease in the rate of retardation of the vehicle the weighted body 181 will move to the right as viewed in Figs. 1 and 2, whereupon the movable contact 183 will disengage either or both of the stationary contacts 185 and 186 to permit the release magnet valve element 147 to return to its seat, thereby cutting off the release of fluid under pressure from the brake cylinder, and to deenergize the winding of the supply magnet valve and permit the supply magnet valve element 132 to return to its normally open position so that fluid under pressure is again supplied to the brake cylinder through the brake valve device 4 providing the pressure of the fluid in the brake cylinder 1 is lower than that in the pressure chamber 39 of the brake valve device 4.

If, however, the rate of retardation of the vehicle is only sufficient to cause the weighted body 181 to move to the right, as viewed in Figure 2, a distance great enough to disengage the movable contact 183 from the stationary contact 186, the movable contact remaining in engagement with the stationary contact 185, the winding of the release magnet valve section 121 will be deenergized thereby cutting off the release of fluid from the brake cylinder, while the winding of the supply magnet valve section 120 will remain energized, thus maintaining the valve element controlled thereby in the closed position to cut off the flow of fluid under pressure to the brake cylinder. As the speed of the vehicle diminishes, the coefficient of friction between the rubbing parts of the brakes will increase and the rate of retardation will again increase and the weighted body 181 will again move to the right to again move the movable contact 183 into engagement with the stationary contact 186 to again energize the winding of the release magnet valve section 121 to move the valve element controlled thereby to the open position and again permit the release of fluid from the brake cylinder and this will continue intermittently to maintain the rate of retardation determined by the adjustment of the spring 194.

As the vehicle approaches a stop the rate of retardation will increase rapidly due to the rapid increase in the coefficient of friction between rubbing parts of the brakes. By the time that the train approaches a stop the pressure of the fluid in the brake cylinder will have been reduced to a value such that the release of fluid through the release magnet valve section will be cut off by the safety check valve device. With the apparatus in this condition fluid may be released from the brake cylinder 1 through the brake valve device 4 by way of the pipe 130, passage 171, past the ball valve 163, which will be unseated by the flow of fluid from the brake cylinder if it is not already unseated by the stem 164, the passage 161 and the pipe 40 which communicates with the pressure chamber 39 in the brake valve device 4. By properly manipulating the brake valve device 4 the operator may control the brakes so as to produce a smooth stop.

It will be seen that for any given adjustment of the spring 194 the inertia responsive control device 6 together with the brake controlling valve device 3 will operate to control the degree of application of the brakes so that the rate of retardation of the vehicle will not exceed a predetermined value. It will also be seen that the pressure on the spring 194 may be adjustably varied and by changing the adjustment of this spring the amount of force required to move the body 181 and, therefore, the rate of retardation to which it is responsive, can be adjustably varied.

It will also be seen that the system provided by my invention incorporates means to manually change the adjustment on the spring 194 and that this means is arranged so that the adjustment of this spring can be varied at any time either while the vehicle is idle or during a service application of the brakes. If during a service application of the brakes it is desired to change the rate of retardation which is automatically effected by means of the inertia responsive control device 6 the operator can do so by moving the operating handle 261 of the manual control member 7. In this manner the rate of retardation of the vehicle can be adjusted to vary between the maximum and minimum values permissible by the inertia responsive control device 6 and the maximum value permitted by this device can be fixed by the adjustment of the screw 214, which, if desired, may be such as to prevent sliding of the wheels of the vehicle.

The system provided by this invention provides means not only to secure a service application of the brakes, but also an emergency application of the brakes, and on an emergency application of the brakes, the fluid pressure in the brake cylinder is immediately increased to a value which will produce the maximum rate of retardation permitted by the inertia responsive control device 6 irrespective of the rate of retardation to which it has been adjusted by operation of the manual control member 7.

When the operating handle 22 is moved to the emergency application position the cam 305 engages the valve device 300 moving this device to the left, as viewed in Figure 1, to close the passage between the chamber 101 and the chamber 102 and opening the passage leading from the chamber 102 to the atmosphere so that the fluid in the chamber 102 and in the safety control pipe 103 can escape to the atmosphere. When the fluid is released from the safety control pipe 103 the fluid in the chamber 97 of the brake valve device 4 is released and the rod 91 and latch block 90 are moved to the left, as viewed in Figure 3, by the spring 105 and the latch block 90 engages the lower end of the lever 89 moving it to the left, as viewed in Figure 3, and effecting movement of the floating pivot carrier 71 to the extreme right of the range of movement permitted this member. This causes the supply valve 44 to be opened and the release valve 55 to close, permitting fluid pressure to build up in the pressure chamber 39 to the maximum value, from which fluid under pressure flows to the brake cylinder by way of the brake pipe 40 and the brake controlling valve device 3.

At the same time when the fluid under pressure is released from the safety control pipe 103 the fluid in the chamber 235 of the control means associated with the inertia responsive control device 6 is released and the spring 238 moves the piston 234 upwardly, thereby effecting movement of the lever 225 which causes the lever 210 to be moved in the counter-clockwise direction to the extreme end of its range of movement and compressing the spring 194, thereby increasing the pressure which is required to move the plunger 191 to the left. This automatically adjusts the inertia responsive control device 6 to the maximum value which is permitted by this device.

When fluid pressure is again supplied to the safety control pipe 103 as a result of movement of the brake control handle 22 to either the service application position or the release position, the pressure of the fluid in the chamber 235 will increase and will cause the piston 234 to be moved downwardly against the pressure of the spring 238 and the spring 194 will be permitted to return to the position to which it has previously been adjusted by means of the manual control means 7. At the same time the pressure of the fluid in the chamber 97 of the brake valve device 4 will be reestablished and the piston 96 will be moved to the right as viewed in Figure 3, thereby moving the rod 91 and the latch block 90 to the right so that the lever 80 controlling the position of the floating pivot carrier 71 will be permitted to return to the position to which it has been adjusted by means of the lever 82.

In addition to the emergency application of the brakes which is controlled by operation of the manual control handle 22 an emergency operation of the brakes is effected if through accident or design pressure is released from the foot pedal 115 of the foot valve device 8. When pressure is released from the pedal 115, the valve element 113 is permitted to move away from the seat formed in the casing 110 and fluid under pressure is permitted to escape from the chamber 111, which is in communication with the control pipe 103 through the pipe 112, to the atmosphere through the passage 114, and the reduction in the pressure of the fluid in the safety control pipe 103 effects an emergency application of the brakes in the same manner as a reduction in the fluid pressure in the safety control pipe by operation of the cam 305 by the manual control lever 22. At the same time fluid under pressure escapes from the main reservoir 2 to the atmosphere through the safety control pipe 103, but the amount of fluid which escapes is limited because of the restricted passage 308 between the main reservoir 2 and the safety control pipe 103. It will be understood that during operation of the vehicle the foot valve device 8 is held in the closed position by the operator.

In order that pressure may be released from the foot pedal 115 of the foot valve device 8 when an application of the brakes has been effected by movement of the manual operating lever 22 there is provided, as a part of the brake valve device 4, a latch 310 pivotally secured to the lever 82 and having an end portion adapted to extend into the notch 311 in the latch block 90. The latch 310 is normally urged to the left, as viewed in Figure 3, by a suitable spring 312, and when the lever 82 is rotated in a clockwise direction the end of the latch 307 projects into the recess 311 to prevent movement of the latch block 90 by the spring 106 so that when there has been an application of the brakes by the manual control device 5 the latch block 90 cannot move to the left, as viewed in Figure 3, to engage the end of the lever 80.

On the release of fluid from the safety control pipe the inertia responsive control device 6 will be automatically adjusted to produce the maximum rate of retardation even though the brake valve device 4 cannot move to the emergency position.

From the foregoing it will be seen I have provided a braking system adapted for use on vehicles and incorporating an inertia responsive retardation control device which regulates the degree of application of the brakes to control the rate of retardation of the vehicles, and that the inertia responsive retardation controller is constructed so that the rate of retardation which it is effective to produce may be adjustably varied during a service application of the brakes.

It will be seen also that the braking system provided by my invention is constructed so as to provide means to effect not only a service application of the brakes, but also an emergency application of the brakes, and that on an emergency application of the brakes the inertia responsive control device is automatically adjusted to produce the maximum rate of retardation of the vehicle permitted by the inertia responsive control device irrespective of the value to which it has been previously adjusted by the manual adjusting means associated therewith.

It will be seen also that the braking system provided by my invention provides means for adjusting the rate of retardation for all rates of retardation less than that provided by any adjustments of the inertia responsive retardation controller, and that this means is directly under the control of the operator of the vehicle through the manual control means and the self-lapping brake valve device employed in the system.

While one embodiment of the brake system employing the retardation controller provided by my invention has been illustrated and described in detail, it should be understood that the invention is not limited to these details of construction and that numerous changes and modifications can be made without departing from the scope of the following claims.

Having thus described my invention what I claim is new and desire to secure by Letters Patent, is:

1. In a vehicle brake apparatus, in combination, manually operable means for effecting an application of the brakes, an inertia responsive member movable in response to changes in the speed of the vehicle and operable to control the degree of application of the brakes, whereby the degree of application of the brakes is limited to a degree effective to produce a predetermined rate of retardation of the vehicle, and manually operated means independent of the manually operable means for effecting an application of the brakes and operable during an application of the brakes for selectively adjusting the inertia responsive means whereby the changes in speed to which said inertia responsive member is responsive are selectively varied, and whereby the inertia responsive member may be selectively adjusted to control the degree of application of the brakes to effect different rates of retardation of the vehicle.

2. In a vehicle brake apparatus, in combination, manually operable means for effecting a service application or an emergency application of the brakes, inertia responsive means comprising an inertia responsive member movable in response to changes in the speed of the vehicle and operable to control the degree of application of the brakes, whereby the degree of application of the brakes is limited to a degree effective to produce a predetermined rate of retardation of the vehicle, and manually operated means independent of the manually operable means for effecting service applications of the brakes and operable during an application of the brakes for selectively adjusting the inertia responsive means whereby the changes in the speed to which said inertia responsive member is responsive are selectively varied, and whereby the inertia responsive member may be selectively adjusted to control the degree of application of the brakes to effect different rates of retardation of the vehicle.

3. In a vehicle brake apparatus, in combination, manually operable means for effecting a service application or an emergency application of the brakes, inertia responsive means comprising an inertia responsive member movable in response to changes in the speed of the vehicle and operable to limit the degree of application of the brakes to a maximum degree of application, whereby the degree of application of the brakes is limited to a degree effective to produce a predetermined rate of retardation of the vehicle, and manually operated means independent of the manually operable means for effecting service or emergency applications of the brakes and operable during a service application of the brakes to selectively adjust the inertia responsive means whereby said inertia responsive means is conditioned to limit the degree of application of the brakes to values less than said maximum degree, and whereby the inertia responsive member may be selectively adjusted to control the degree of application of the brakes to effect different rates of retardation of the vehicle.

4. In a vehicle brake apparatus, in combination, manually operable means for effecting a service application or an emergency application of the brakes, inertia responsive means comprising an inertia responsive member movable in response to changes in the speed of the vehicle and operable to limit the degree of application of the brakes to a maximum degree of application, whereby the degree of application of the brakes is limited to a degree effective to produce a predetermined rate of retardation of the vehicle, means independent of the manually operable means for effecting applications of the brakes to selectively adjust the inertia responsive means whereby said inertia responsive means is conditioned to limit the degree of application of the brakes to values less than said maximum degree and whereby the inertia responsive member may be selectively adjusted to control the degree of application of the brakes to effect different rates of retardation of the vehicle, and means automatically operable on an emergency application of the brakes to condition the inertia responsive means to permit said maximum degree of application of the brakes irrespective of the adjustment of said inertia responsive means.

5. In a vehicle brake apparatus, in combination, manually operable means for effecting a service application or an emergency application of the brakes, inertia responsive means comprising an inertia responsive member movable in response to changes in the speed of the vehicle and operable to limit the degree of application of the brakes to a maximum degree of application, whereby the degree of application of the brakes is limited to a degree effective to produce a predetermined rate of retardation of the vehicle, and manually operated means independent of the manually operable means for effecting applications of the brakes to selectively adjust the inertia responsive means whereby said inertia responsive means is conditioned to limit the degree of application of the brakes to values less than said maximum degree and whereby the inertia responsive member may be selectively adjusted to control the degree of application of the brakes to effect different rates of retardation of the vehicle, the inertia responsive means being operable to limit the degree of application of the brakes to values less than said maximum value only during the service application of the brakes.

6. In a vehicle brake apparatus, in combination, manually operable means for effecting a service application or an emergency application of the brakes, inertia responsive means comprising an inertia responsive member movable in response to changes in the speed of the vehicle and operable to control the degree of application of the brakes, whereby the degree of application of the brakes is limited to a degree effective to produce a predetermined rate of retardation of the vehicle, and means for selectively adjusting the inertia responsive means whereby the change in the speed to which said inertia responsive member is responsive may be selectively varied and whereby the inertia responsive member may be selectively adjusted to control the degree of application of the brakes to effect different rates of retardation of the vehicle, the means for selectively adjusting the inertia responsive means being operable irrespective of the condition of the brakes or of operation of the manually operable member for effecting an application of the brakes.

7. In a vehicle brake apparatus, in combination, manually operable means for effecting a service application or an emergency application of the brakes, inertia responsive means comprising an inertia responsive member movable in response to changes in the speed of the vehicle and operable to control the degree of application of the brakes, whereby the degree of application of the brakes is limited to a degree effective to produce a predetermined rate of retardation of the vehicle, and other manually operable means for selectively adjusting the inertia responsive means whereby the change in the speed to which said inertia responsive member is responsive may be selectively varied, and whereby the inertia responsive member may be selectively adjusted to control the degree of application of the brakes to effect different rates of retardation of the vehicle, the means for selectively adjusting the inertia responsive means being operable during a service application of the brakes.

8. In a vehicle brake apparatus, in combination, manually operable means for effecting a service application or an emergency application of the brakes, inertia responsive means comprising an inertia responsive member movable in response to changes in the speed of the vehicle and operable to control the degree of application of the brakes, whereby the degree of application of the brakes is limited to a degree effective to produce a predetermined rate of retardation of the vehicle, and other manually operable means for selectively adjusting the inertia responsive means whereby the change in the speed to which said inertia responsive member is responsive may be selectively varied and whereby the inertia responsive member may be selectively adjusted to control the degree of application of the brakes to effect different rates of retardation of the vehicle, safety means for effecting an emergency application of the brakes, means responsive to manually applied pressure of an operator for preventing operation of said safety means and providing for operation thereof upon release of said manually applied pressure, and means automatically operable on an emergency application of the brakes to condition the inertia responsive means to permit a high degree of application of the brakes irrespective of the adjustment of the said inertia responsive means.

9. In a vehicle brake apparatus, in combination, manually operable means for effecting an application of the brakes, inertia responsive means comprising an inertia responsive member movable in response to changes in the speed of the vehicle and operable to control the degree of application of the brakes, whereby the degree of application of the brakes is limited to a degree effective to produce a predetermined rate of retardation of the vehicle, and manually operated means independent of the manually operated means for effecting an application of the brakes and operable during an application of the brakes for selectively adjusting the inertia responsive means whereby the change in speed to which said inertia responsive member is responsive may be selectively varied and whereby the inertia responsive member may be selectively adjusted to control the degree of application of the brakes to effect different rates of retardation of the vehicle, said manually operable means being operable to effect different degrees of application of the brakes, whereby the degree of application of the brakes for values less than the degree of application determined by the inertia responsive means may be selectively varied by said manual means.

10. In a vehicle brake apparatus, in combination, manually operable means for effecting an application of the brakes, an inertia responsive member movable in response to changes in the speed of the vehicle and operable to control the degree of application of the brakes, whereby the degree of application of the brakes is limited to a degree effective to produce a predetermined rate of retardation of the vehicle, and means for selectively adjusting the inertia responsive means whereby the change in the speed to which said inertia responsive member is responsive may be selectively varied and whereby the inertia responsive member may be selectively adjusted to control the degree of application of the brakes to effect different rates of retardation of the vehicle, the means for selectively adjusting the inertia responsive means being operable irrespective of the condition of the brakes or of operation of the manually operable means for effecting an application of the brakes.

11. In a vehicle brake apparatus, in combination, a brake cylinder, manually operable means for controlling the supply and release of fluid under pressure to and from the brake cylinder, a cut-off valve controlling the supply of fluid under pressure to the brake cylinder, a release valve controlling the release of fluid from the brake cylinder, inertia responsive means comprising an inertia responsive member movable in response to changes in the rate of speed of the vehicle, and operable in response to one rate of change of speed of the vehicle to control the cut-off valve to cut off the supply of fluid to the brake cylinder and operable in response to a greater rate of change of speed of the vehicle to control the release valve to release fluid under pressure from the brake cylinder, and manually operated means operable during an application of the brakes to adjustably vary the inertia responsive means whereby the change in the rate of speed of the vehicle which is effective to move the inertia responsive member to control the cut-off valve may be adjustably varied, the difference between the rate of change of speed effective to move the inertia responsive member to control the cut-off valve and to control the release valve being substantially constant irrespective of changes in the adjustment of the inertia responsive means.

12. In a vehicle brake apparatus, in combination, a brake cylinder, a cut-off valve controlling the supply of fluid under pressure to the brake cylinder, a release valve controlling the release of fluid from the brake cylinder, inertia responsive means comprising an inertia responsive member movable in response to changes in the rate of speed of the vehicle, and operable in response to one rate of change of speed of the vehicle to control the cut-off valve to cut off the supply of fluid to the brake cylinder, and operable in response to a greater rate of change of speed of the vehicle to control the release valve to release fluid under pressure from the brake cylinder, means operable during an application of the brakes to adjustably vary the inertia responsive means whereby the change in the rate of speed of the vehicle which is effective to move the inertia responsive member to control the cut-off valve may be adjustably varied, and manually operable means for controlling the pressure of fluid in the brake cylinder independent of the cut-off and release valves, whereby the brakes may be controlled to effect smaller changes in the rate of speed of the vehicle than the changes in the rate of speed which are effective to move the inertia responsive member to control the cut-off or release valves.

13. In a vehicle brake apparatus, in combination, a brake cylinder, manually operable means for controlling the pressure of fluid in the brake cylinder, a cut-off valve controlling the supply of fluid under pressure to the brake cylinder, a release valve controlling the release of fluid under pressure from the brake cylinder, inertia responsive means comprising a member movable in response to changes in the rate of speed of the vehicle and operable in response to one rate of change in the speed of the vehicle to control the cut-off valve to cut off the supply of fluid to the brake cylinder, and operable in response to a greater rate of change in the speed of the vehicle to control the release valve to effect a release of fluid under pressure from the brake cylinder, whereby the degree of application of the brakes is limited to a degree effective to produce a predetermined rate of change in the speed of the vehicle, and means independent of the manually operable means for controlling the pressure of the fluid in the brake cylinder for selectively adjusting the inertia responsive means during an application of the brakes whereby the change in the rate of speed to which said inertia responsive member is responsive may be selectively varied and whereby the inertia responsive member may be selectively adjusted to control the degree of application of the brakes to effect different rates of change in the speed of the vehicle.

14. In a vehicle brake apparatus, in combination, a brake cylinder, manually operable means for controlling the pressure of the fluid in the brake cylinder, said manually operable means being operable to effect a service application of the brakes or an emergency application of the brakes, a cut-off valve controlling the supply of fluid under pressure to the brake cylinder, a release valve controlling the release of fluid under pressure from the brake cylinder, inertia responsive means comprising a member movable in response to changes in the speed of the vehicle and operable in response to one rate of change in the speed of the vehicle to control the cut-off valve to cut off the supply of fluid to the brake cylinder and operable in response to a greater rate of change in the speed of the vehicle to control the release valve to effect a release of fluid under pressure from the brake cylinder, whereby the degree of application of the brakes is limited to a degree effective to produce a predetermined rate of retardation of the vehicle, the inertia responsive means being operable to limit the degree of application of the brakes to a maximum degree of application, means independent of the manually operable means for controlling the pressure of the fluid in the brake cylinder and operable during an application of the brakes, for selectively adjusting the inertia responsive means, whereby the change in the rate of speed to which the inertia responsive member is responsive may be selectively varied and whereby said inertia responsive means is conditioned to limit the degree of application of the brakes to values less than said maximum degree, the inertia responsive means being automatically conditioned to permit the maximum degree of application of the brakes on an emergency application of the brakes irrespective of the adjustment of the said inertia responsive means.

15. In a vehicle brake apparatus, in combination, manually operable means for effecting a service application or an emergency application of the brakes, inertia responsive means comprising an inertia responsive member movable in response to changes in the speed of the vehicle and operable to control the degree of application of the brakes, whereby the degree of application of the brakes is limited to a degree effective to produce a predetermined rate of retardation of the vehicle, and means operable independently of the manually operable means for effecting applications of the brakes for selectively adjusting the inertia responsive means whereby the change in the speed to which said inertia responsive member is responsive may be selectively varied, and whereby the inertia responsive member may be selectively adjusted to control the degree of application of the brakes to effect different rates of retardation of the vehicle, the means for adjusting the inertia responsive means comprising a member movable between spaced points, manually operable means for moving said member between said spaced points, and means automatically operable on an emergency application of the brakes for moving said member between said spaced points.

16. In a vehicle brake apparatus, in combination, manually operable means for effecting a service application or an emergency application of the brakes, inertia responsive means comprising an inertia responsive member movable in response to changes in the speed of the vehicle and operable to control the degree of application of the brakes whereby the degree of application of the brakes is limited to a degree effective to produce a predetermined rate of retardation of the vehicle and means for selectively adjusting the inertia responsive means, whereby the change in the speed to which said inertia responsive member is responsive may be selectively varied and whereby the inertia responsive member may be selectively adjusted to control the degree of application of the brakes to effect different rates of retardation on the vehicle, the means for adjusting the inertia responsive means comprising a member movable between spaced points, said means being normally urged toward one of the said spaced points, manually operable means for moving said member toward the other of said spaced points, and means automatically operable on an emergency application of the brakes for moving said member to said last named point, said last named means being operable irrespective of the point to which the movable member is moved by said manually operable means.

17. In an inertia responsive device adapted to control the application of the brakes on a vehicle, a member having a normal position, said member having a plurality of resilient means associated therewith and yieldingly opposing movement of said member away from said normal position, said member being movable from said normal position responsive to inertia, and manually operable means operable during an application of the brakes to adjustably vary one of said resilient means whereby the force of inertia required to move said inertia responsive member against said resilient means may be adjustably varied.

18. In an inertia responsive device adapted to control the application of the brakes on a vehicle, a pendulum pivotally supported on an axis, said pendulum having a normal position, a plurality of springs yieldingly opposing movement of said pendulum away from said normal position, the pendulum being movable away from said normal position responsive to inertia, and manually operable means operable during an application of the brakes to adjustably vary the force exerted by one of said springs on said pendulum whereby the force of inertia required to move said pendulum may be adjustably varied.

19. In an inertia responsive device adapted to control the application of the brakes on a vehicle, a pendulum pivotally supported on an axis, said pendulum having a normal position, a spring associated with said pendulum and opposing movement of said pendulum away from the normal position in one direction, and manually operable means operable during an application of the brakes to adjustably vary the force exerted by said spring on said pendulum whereby the force of inertia required to move said pendulum against said spring may be adjustably varied, the means for adjustably varying the force exerted by said spring on said pendulum comprising a member movable between spaced points, and manually operable means to effect movement of said member to one of said spaced points.

20. In an inertia responsive device, a pendulum pivotally supported on an axis, said pendulum having a normal position, a spring associated with said pendulum and opposing movement of said pendulum away from the normal position in one direction, and manually operable means to adjustably vary the force exerted by said spring on said pendulum whereby the force of inertia required to move said pendulum against said spring may be adjustably varied, the means for adjustably varying the force exerted by said spring on said pendulum comprising a member movable between spaced points, said member being urged to one of said spaced points by said spring, and manually operable means to effect movement of said member to the other of said spaced points.

21. In an inertia responsive device, a pendulum pivotally supported on an axis, said pendulum having a normal position, a spring associated with said pendulum and opposing movement of said pendulum away from the normal position in one direction, means to adjustably vary the force exerted by said spring on said pendulum whereby the force of inertia required to move said pendulum against said spring may be adjustably varied, the means for adjustably varying the force exerted by said spring on said pendulum comprising a member movable between spaced points, said member being urged to one of said spaced points by said spring, and a plurality of means to effect movement of said member toward the other of said spaced points, each of said means being operable to effect movements of said member toward said last named spaced point irrespective of the position to which said member has been adjusted by other of said means.

22. In an inertia responsive device adapted to control the application of the brakes on a vehicle, a pendulum pivotally supported on an axis, said pendulum having a normal position, a spring associated with said pendulum and opposing movement of said pendulum away from said normal position in one direction, a second spring associated with said pendulum and opposing movement of said pendulum away from the normal position beyond a zone adjacent said normal position, and manually operable means operable during an application of the brakes to adjustably vary the force exerted by said first named spring on said pendulum whereby the force of inertia required to move said pendulum may be adjustably varied, and whereby the additional force required to move said pendulum outside said zone adjacent the normal position is substantially constant irrespective of the adjustment of the first spring.

23. In a vehicle brake, in combination, manually operable means for effecting a service application of the brakes, inertia responsive means comprising an inertia responsive member movable in response to changes in the speed of the vehicle and operable to control the degree of application of the brakes, whereby the degree of application of the brakes is limited to a degree effective to produce a predetermined rate of retardation of the vehicle, means independent of the manually operable means for effecting a service application of the brakes for selectively adjusting the inertia responsive means whereby the changes in the rate of speed to which said inertia responsive member is responsive are selectively varied, and whereby the inertia responsive member may be selectively adjusted to control the degree of application of the brakes to effect different rates of retardation of the vehicle, a safety control pipe, and means responsive to a reduction of the pressure of the fluid in said safety control pipe and operable to condition said inertia responsive means to permit a high degree of application of the brakes irrespective of the adjustment of said inertia responsive means.

24. In a brake equipment for vehicles, in combination, a brake cylinder, manually operable brake controlling means for controlling the supply of fluid under pressure to said brake cylinder, a retardation controller responsive to the rate of deceleration of the vehicle for regulating the degree of fluid pressure in said brake cylinder, said retardation controller comprising an inertia responsive element and biasing means for opposing movement of said inertia responsive element, and manually operable means independent of the brake controlling means and operable during an application of the brakes for varying the force exerted on said inertia responsive element by said biasing means.

25. In a brake equipment for a vehicle, in combination, braking means, a manually operable member for effecting an application of the braking means and for varying the degree of application of the braking means between predetermined limits, retardation control means for controlling the braking means, said retardation control means comprising relatively movable elements operable in response to a predetermined degree of movement relative to each other for limiting the degree of application of the braking means to values less than the maximum which may be effected by the manually operable member, one of said elements being movable responsive to retardation of the vehicle, one of said elements having adjusting means associated therewith whereby the rate of retardation of the vehicle effective to produce the predetermined degree of relative movement between said elements may be adjustably varied, cam actuated means for varying said adjusting means under service conditions, and manually controlled means for operating said cam means.

26. In an inertia responsive device adapted to control the application of the brakes on a vehicle, a member movable responsive to inertia, said member having a normal position, a spring associated with said member and opposing movement of said member away from the normal position, a second spring associated with said member and opposing movement thereof away from the normal position beyond a zone adjacent the normal position, and manually operable means operable during an application of the brakes to adjustably vary the force exerted by said first named spring on said member whereby the force of inertia required to move said member from the normal position may be adjustably varied, and whereby the additional force required to move said member outside said zone adjacent the normal position is substantially constant irrespective of the adjustment of the first named spring.

CLYDE C. FARMER.

CERTIFICATE OF CORRECTION.

Patent No. 2,081,663.  May 25, 1937.

CLYDE C. FARMER.

It is hereby certified that error appears in the printed specification of the above numbered patent requiring correction as follows: Page 12, first column, line 20, claim 21, for the word "movements" read movement; and that the said Letters Patent should be read with this correction therein that the same may conform to the record of the case in the Patent Office.

Signed and sealed this 27th day of July, A. D. 1937.

Henry Van Arsdale
Acting Commissioner of Patents.

(Seal)